May 8, 1923.
C. A. HAMILTON ET AL
OIL FILTER
Filed Aug. 25, 1920
1,454,113
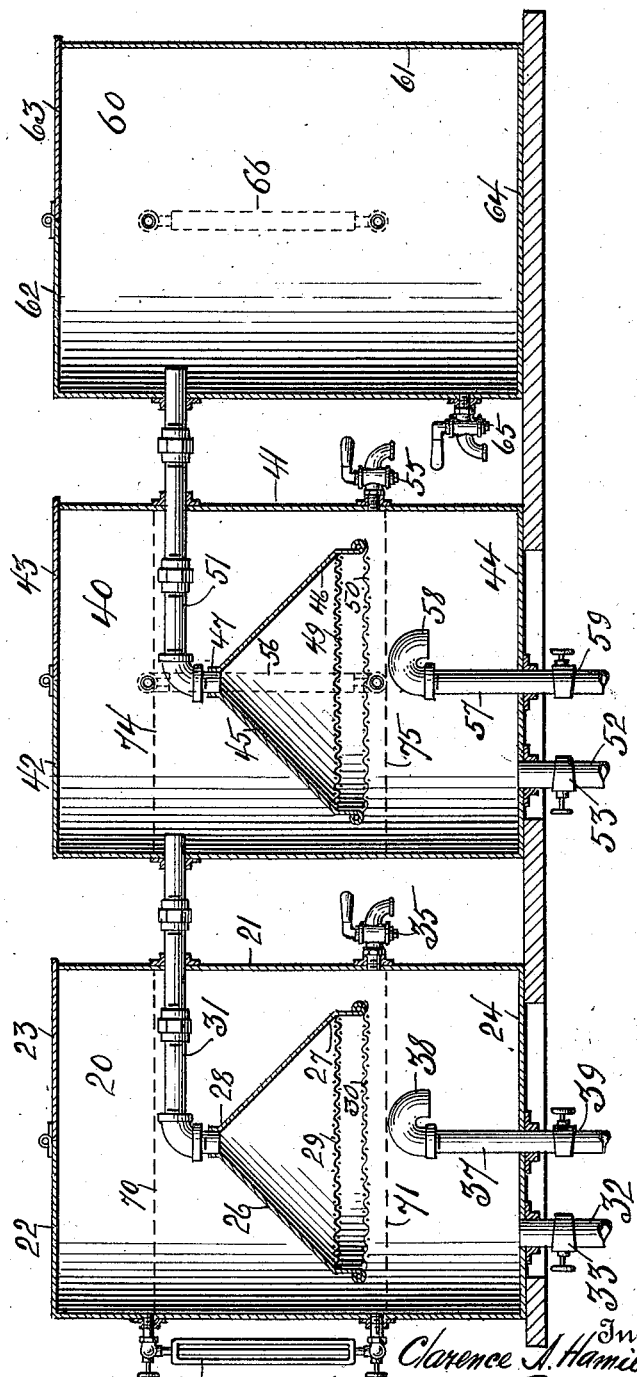
Inventor
Clarence A. Hamilton AND
By their Attorney Benjamin F. Noyes Patented May 8, 1923.

1,454,113

UNITED STATES PATENT OFFICE.

CLARENCE A. HAMILTON, OF BROOKLYN, NEW YORK, AND BENJAMIN F. NOYES, OF BAYONNE, NEW JERSEY.

OIL FILTER.

Application filed August 25, 1920. Serial No. 406,004.

*To all whom it may concern:*

Be it known that we, CLARENCE A. HAMILTON and BENJAMIN F. NOYES, citizens of the United States, and resident, respectively, of the borough of Brooklyn, city of New York, in the county of Kings, State of New York, and Bayonne, county of Hudson, State of New Jersey, have invented certain new and useful Improvements in an Oil Filter, of which the following is a specification.

This invention relates to an oil filter. The filter may also be used for various other fluids requiring filtration. The filter comprises a plurality of tanks in each of which except the last one or storage tank, the fluid is filtered by gravity and by mechanical means. The tanks are connected by piping and the fluids in the different tanks are maintained above said piping at the same level, to obtain a continuous easy flow of the fluid treated, from the first or inlet tank to the last or storage tank at the same hydrostatic pressure.

The accompanying drawings represent an exemplification of the filter. In this instance three tanks are used which are indicated by the numerals 20, 40 and 60. It is to be understood, however, that a different number of tanks may be employed but the tanks are preferably of the same height. The tank 20 is the charging tank and comprises the side wall 21, the top 22 with the hinged door 23 and the bottom 24. A funnel shaped outlet fitting 26 with the large inlet end 27 and the apex 28 has connected to its large end 27 the wire screen 29, and the filter cloth 30. Piping 31 leads from the apex 28 of the outlet fitting 26 to and into the tank 40. Drain piping 32 with the valve 33 is connected to the bottom 24. A cock 35 and the water glass 36 are connected to the wall 21. A drain pipe 37 is connected to the bottom 24 and extends into the tank 20. The drain pipe 37 has connected thereto the U shaped fitting 38 and the valve 39.

The tank 40 is designated as the intermediate tank and is similar in construction to the charging tank 20. It consists of the side wall 41, the top 42 with the hinged door 43 and the bottom 44. A funnel shaped outlet fitting 45, at the same level with the fitting 26 has the large inlet end 46 and the apex 47 has connected to its inlet end 46 the wire screen 49 and the filter cloth 50.

Piping 51 on the same level with the piping 31 leads from the apex 47 of the outlet fitting 45 to and into the tank 60. Drain piping 52 with the valve 53 is connected to the bottom 41. A cock 55 on the same level with the cock 35 and the water glass 56 on the same level with the water glass 36 are connected to the wall 41. A drain pipe 57 is connected to the bottom 44 and extends into the tank 40. The drain pipe 57 has connected thereto the U shaped fitting 58 on the same level with the fitting 38 and the valve 59.

The tank 60 is designated as the storage tank and comprises the side wall 61, the top 62 with the hinged door 63 and the bottom 64. An outlet cock 65 and water glass 66 are connected to the wall 61. By means of the equal levels of the appurtenances in the tanks, the fluids therein are maintained at the same hydrostatic pressure.

To operate the filter, the storage tank 20 is charged with the fluid to be filtered up to the level 70. The water in the fluid separates therefrom by gravity and its level is indicated at 71. The impurities held in mechanical solution will also fall to the bottom of the tank 20. The separated oil will flow through the filter cloth 30 the wire screen 29 and through the piping 31 into the tank 40. The water or other heavy fluid separated from the oil is discharged through the pipe 37 and the impurities and settlings that collect at the bottom of the tank 20 are discharged by the drain piping 32. By means of the stop cock 35 oil can be discharged from the tank 40 before entering the funnel shaped outlet fitting 26. The operations in the intermediate tank 40 are similar to those described for tank 20. The filtered oil as it enters the tank 40 rises to the level 74 which is at the same level as the fluid in the tank 20 indicated at 70. The water remaining in the oil is separated by gravity and drops to the bottom of the tank where its level is indicated at 75, which is the same as the level 71 in the tank 20. The impurities still held in mechanical solution will drop to the bottom of the tank 40 and are removed by the piping 52. The separated oil if desired can be discharged by means of the cock 55, which is on the same level with the cock 35 or it can flow through the filter cloth 50, the wire screen 49 and through the piping 51, which is on the same level with the piping 31, into the storage tank 60.

From the latter tank the filtered oil can be drawn by means of the cock 65.

Having described our invention what we desire to secure by Letters Patent and claim is:—

In a filter of the character described the combination of a plurality of tanks on the same level, a funnel shaped outlet fitting in the first tank positioned with its large inlet end below its apex, a screen and filter cloth at the large inlet end of the fitting, a cock connected to the tank to drain off fluid that has been separated from a portion of its impurities and heavy fluids previously held in suspension, drain piping connected to the bottom of the tank to drain off settlings and heavy fluids located adjacent to the bottom of the tank, a drain pipe connected to the bottom of the tank and extending up into the same, a second tank, piping leading from the outlet at the apex of the outlet fitting in the first tank to the second tank, a funnel shaped outlet fitting in the second tank positioned with its large inlet end below its apex, a screen and a filter cloth at the large inlet end of the second fitting, a cock connected to second tank at the same level with the cock connected to the first tank, to drain off the fluid in said second tank that has separated therefrom a portion of its impurities and heavy fluids previously held in suspension, drain piping connected to the bottom of the tank to drain off settlings and heavy fluids located adjacent to the bottom of the tank, a drain pipe connected to the bottom of the second tank and extending up into the same, a third tank, piping extending from the outlet end of the fitting in the second tank to the third tank, the latter piping on a level with the piping between the first and second tank, and an outlet cock for the third tank.

Signed at the borough of Brooklyn, city of New York, in the county of Kings and State of New York, this 11th day of August, A. D. 1920.

CLARENCE A. HAMILTON.
BENJAMIN F. NOYES.